(12) United States Patent
Kulkarni

(10) Patent No.: US 11,196,739 B2
(45) Date of Patent: Dec. 7, 2021

(54) AUTHORIZATION ACTIVATION

(71) Applicant: Avaya Inc., Santa Clara, CA (US)

(72) Inventor: Sudhindra Kulkarni, Bangalore (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/801,340

(22) Filed: Jul. 16, 2015

(65) Prior Publication Data
US 2017/0019402 A1    Jan. 19, 2017

(51) Int. Cl.
*G06F 21/00* (2013.01)
*H04L 29/06* (2006.01)
*G10L 17/00* (2013.01)
*H04W 12/65* (2021.01)

(52) U.S. Cl.
CPC ...... *H04L 63/0861* (2013.01); *H04L 63/0807* (2013.01); *G10L 17/00* (2013.01); *H04L 63/083* (2013.01); *H04W 12/65* (2021.01)

(58) Field of Classification Search
CPC ............... H04L 63/0861; H04L 63/083; H04L 63/0807; G10L 17/22; G10L 17/00; H04W 12/65
See application file for complete search history.

(56) References Cited

U.S. PATENT DOCUMENTS

| 8,621,037 | B2 | 12/2013 | Li et al. | |
|---|---|---|---|---|
| 8,843,999 | B1* | 9/2014 | Vasquez | H04L 65/1006 726/3 |
| 2003/0163739 | A1* | 8/2003 | Armington | G10L 17/00 726/3 |
| 2011/0143714 | A1* | 6/2011 | Keast | H04W 12/069 455/411 |
| 2011/0143715 | A1* | 6/2011 | Labrador | H04M 3/382 455/411 |
| 2011/0239283 | A1* | 9/2011 | Chern | H04L 63/0815 726/6 |
| 2012/0028609 | A1* | 2/2012 | Hruska | H04W 12/02 455/411 |
| 2012/0144202 | A1* | 6/2012 | Counterman | H04L 9/3228 713/176 |
| 2013/0080911 | A1 | 3/2013 | Klemm | |
| 2013/0086210 | A1* | 4/2013 | Yiu | H04W 12/068 709/217 |
| 2013/0273886 | A1 | 10/2013 | Mohajeri | |
| 2013/0289999 | A1* | 10/2013 | Hymel | G10L 21/0208 704/273 |
| 2013/0297413 | A1 | 11/2013 | Pattan | |
| 2014/0041055 | A1 | 2/2014 | Shaffer et al. | |
| 2014/0143837 | A1* | 5/2014 | Fletcher | H04L 63/105 726/4 |
| 2014/0189808 | A1* | 7/2014 | Mahaffey | H04L 63/083 726/4 |

(Continued)

FOREIGN PATENT DOCUMENTS

WO    WO 2014159610    10/2014

*Primary Examiner* — Kendall Dolly
(74) *Attorney, Agent, or Firm* — Sheridan Ross P.C.

(57) ABSTRACT

The present disclosure is directed to systems and methods of obtaining authorization for an application or client to access certain privileged resources on behalf of a user in the OAuth2 protocol based on a voice input; validating an authentication token; and logging in to a service based on the validation.

20 Claims, 10 Drawing Sheets

(56) References Cited

U.S. PATENT DOCUMENTS

2015/0095028 A1* 4/2015 Karpey .................. G10L 17/26
704/246
2015/0319170 A1* 11/2015 Grossemy ........... H04L 63/0861
713/186
2016/0300576 A1* 10/2016 Karpey ................. H04M 3/493

* cited by examiner

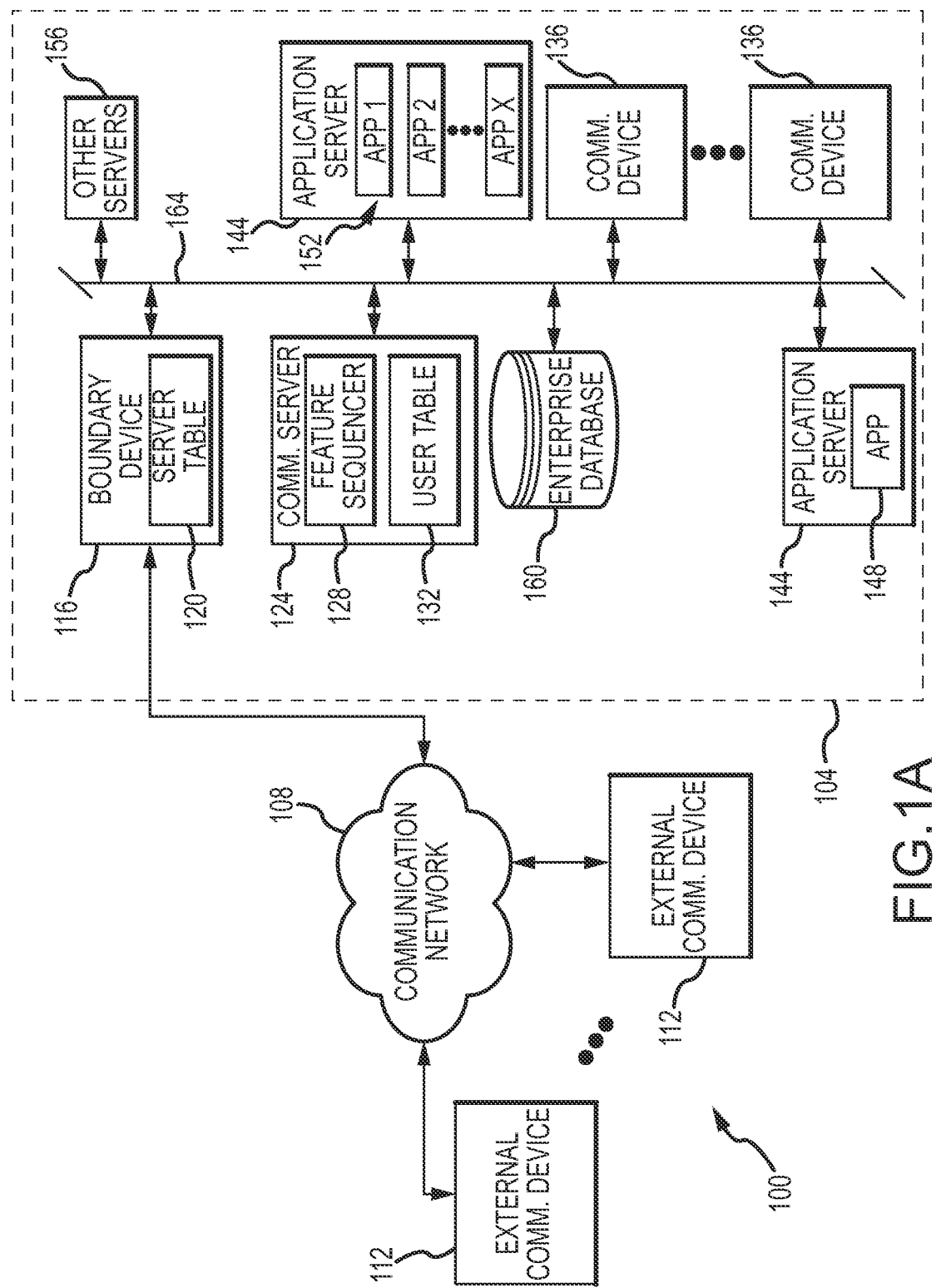

AUTHORIZATION ACTIVATION

FIELD OF THE DISCLOSURE

The disclosure relates generally to authorization and specifically to authorization for server resources using voiceprint or telephone password.

BACKGROUND

OAuth2 is an open standard for authorization that allows users to access private resources of third-party applications without having to provide a user name and password, instead using an access token. OAuth2 provides client applications secure delegated access to server resources on behalf of a resource owner by specifying a process for resource owners to authorize third-party access to server resources without sharing credentials. Designed specifically to work with Hypertext Transfer Protocol (HTTP), OAuth2 allows access tokens to be issued to third-party clients by an authorization server with the approval of the resource owner or end-user. The client then uses the access token to access the protected resources hosted by the resource server. OAuth2 is commonly used as a way for web surfers to log into third party web sites using Google, Facebook, or Twitter accounts without worrying about access credentials being compromised and without having to maintain separate credentials for multitudes of websites. Thus, users may access accounts using open authentication protocols that would otherwise require a username and password.

SUMMARY

The complexity of creating interfaces to networked speech processing systems has prevented speech capabilities from entering many important software market segments. Today, OAuth2 is a browser-based service, and OAuth2 requires a browser for authorization. In fact, an OAuth2 token is generated from a known source and is used to authenticate with another server, directed by an end-user through a Graphical User Interface (GUI). However, the dependence of OAuth2 on browser capabilities is problematic. For example, not all telephones have browsers and users may not always have access to a browser and/or browser capabilities, which would prevent the use of OAuth2 authentication for the end-user. In a situation lacking a browser, there can be no end-user redirect of the access token through a GUI.

The proposed disclosure advantageously provides a voice-activated Telephone User Interface (TUI) that provides OAuth2 functionality. Using a TUI, voice-activation can be used to provide the token request. A voiceprint or telephone password may be used. After initiation, the open authentication may function as normal, with the functionality following the usual steps on the server side. The voice-activation wouldn't necessarily have to be used with each instance. The call flow can be mapped to the server steps, providing access to services as if a browser had been used by the end-user. Therefore, aspects of the present disclosure provide the concept of use of a voicepoint or telephone password to overcome the aforementioned shortcomings.

Systems and methods disclosed herein advantageously extend open authentication functionality to non-browser based environments and to circumstances where browser capabilities are inaccessible or nonexistent. Systems and methods disclosed herein may be used with various types of open authentication, including but not limited to OAuth and OAuth2. User authentication may be referred to herein as "OAuth," "OAuth2," and "open authentication." Examples of the types of environments having open authentication functionality include communication devices such as a personal computer, laptop computer, Personal Digital Assistant, telephone, mobile phone, cellular phone, other hands-free, voice-capable devices, and the like. These may use communication sessions that include voice, video, and/or instant messaging.

Exemplary types of applications that may be utilized for a communication session include, without limitation, call recording applications, communication log services, conferencing applications, security applications, encryption applications, collaboration applications, whiteboard applications, mobility applications, presence applications, media applications, messaging applications, bridging applications, and any other type of application that can supplement or enhance communications.

Various methods of the present disclosure include methods for authentication of a user, including: receiving a voice input from the user; requesting an authentication token based on the voice input; validating the authentication token; and logging in to a service based on the validation.

Various systems of the present disclosure include systems for authentication of a user, including: a user device; and an authentication server; the system configured to: receive a voice input from the user at the user device; request an authentication token based on the voice input; validate the authentication token; and log in to a service based on the validation.

Various aspects of the disclosure can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space. Further, the methods detailed herein can also be methods performed at least in part by a service agent and/or a machine manipulated by a service agent in response to a service request.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

FIG. 1A is an illustrative block diagram depicting a communication system in accordance with embodiments of the present disclosure;

DETAILED DESCRIPTION

Figure 1B:
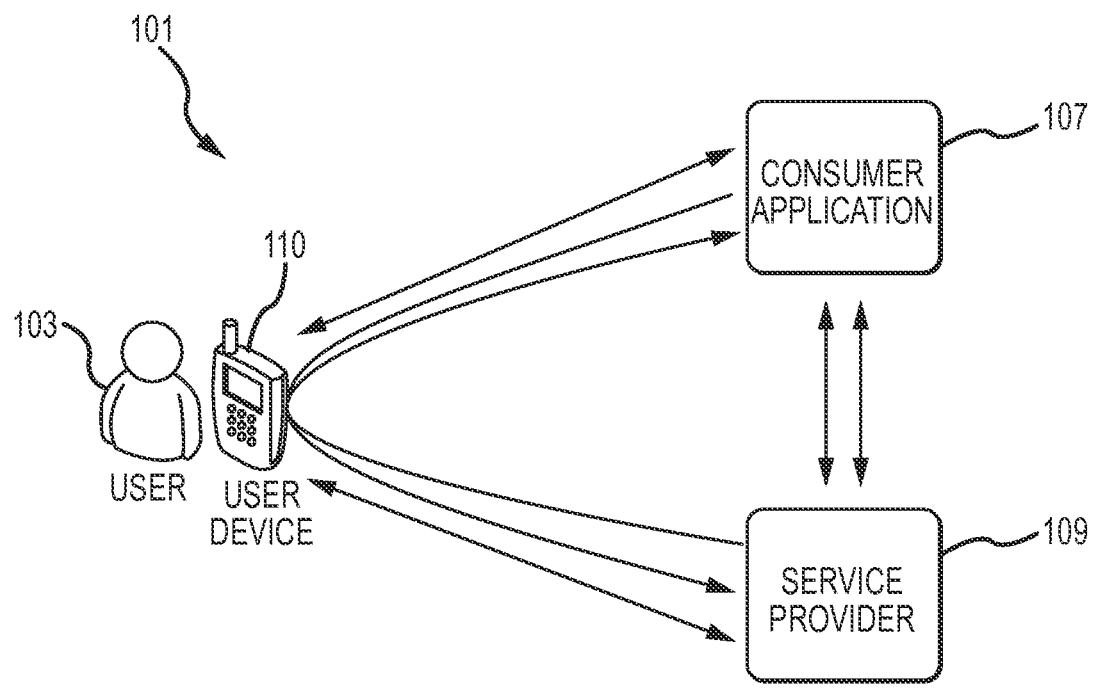
FIG. 1B is an illustrative block diagram depicting a communication system in accordance with embodiments of the present disclosure.

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to perform authorization.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

FIG. 1A depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may include similar functionality, but may be provisioned for providing its features to only a subset of all enterprise users. In particular, a first communications server 124 may be authoritative for and service a first subset of enterprise users whereas a second communications server 124 may be authoritative for and service a second subset of enterprise users, where the first and second subsets of users generally do not share a common user. This is one reason why the network boundary device 116 may be provided with a server table 120.

Additionally, multiple servers 124 can support a common user community. For example, in geo-redundant and other applications where users aren't necessarily bound to a single application server, there may be a cluster of equivalent servers where a user can be serviced by any server in the cluster.

In accordance with at least some embodiments of the present disclosure, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but this is not necessarily required. In situations where more than two enterprise users are involved in a communication session, authoritative communications servers 124 for each of the involved users may be employed without departing from the scope of the present disclosure. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, this process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 includes a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present disclosure.

The other servers 156 may include email servers, voicemail servers, calendaring servers, conferencing servers, and other types of servers known to provide particular services to client devices. In some embodiments, the other servers 156 may also be considered application servers 144, which provide one or more applications for use in a communication session.

The internal communication devices 136 can be similar or identical to the external communication devices 112, except they are provisioned, and often owned, by the enterprise. Exemplary types of communication devices 112 include, without limitation, any capable phone, hardphone, softphone, and/or digital telephone. Examples of suitable telephones include the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videophone™), and softphones of Avaya, Inc.

The enterprise database 160 includes enterprise subscriber information, such as name, job title, electronic address information (e.g., telephone number, email address, instant messaging handle, direct dial extension, and the like), subscriber contact lists (e.g., contact name and electronic address information), other employee records, and the like.

The various servers and components depicted in FIG. 1A may be implemented separately (i.e., on different servers) or together (i.e., on a single server). In particular, two or more depicted components may be implemented on a single server without departing from the scope of the present disclosure. Thus, a single device may provide the functionality of several components depicted separately in FIG. 1A. As another example, the boundary device 116 and communication server 124 may be implemented on a single device.

FIG. 1B depicts a communication system 101 according to an embodiment of the present disclosure. The communication system 101 may include a user device 105 associated with a user 103 and in communication with a service provider 109 and a consumer application 107. The user device 105 may be referred to herein as a user terminal, and it may include, but is not limited to, any type of communication device, such as a mobile device. Instead of the user device 105 depicted in FIG. 1, the user device 105 may be an application or client, for example, accessing the resources on behalf of the user 103. The consumer application 107 includes, but it not limited to, an application or applications on a mobile device. The consumer application 107 may also be referred to as a client, a client application, or a mobile application. The consumer application 107 is attempting to get access to an account of the user. The consumer application 107 requires permission from the user before it may gain access to the user's account. The service provider 109 includes, but is not limited to, a resource server (also referred to herein as "RS") which may be a browser add-on, or an API server The service provider 109 may also be referred to as a controller (e.g., the controller 204 in FIG. 2).

The OAuth2 protocol enables a consumer application 107 to access protected resources from a service provider 109 without requiring a user 103 to disclose their service provider credentials at the consumer application 107. In accordance with the open authentication protocol, privacy management is handled by users themselves. Users authorize consumer applications to access protected resources of a service provider. Once the authorization is given, the consumer application gets an access token (which may also be referred to as, for example, a ticket or a cryptographic ticket) to access to the protected resources.

Figure 2:
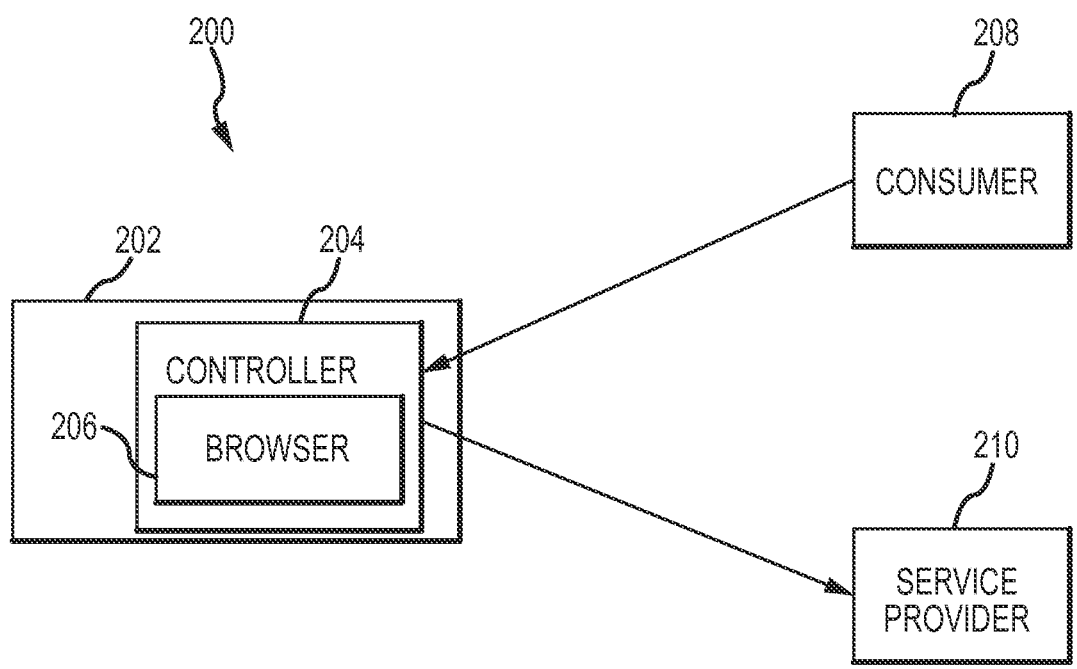
FIG. 2 is an illustrative description of a prior art authentication flow.

FIG. 2 is an illustrative description of a prior art authentication flow. In particular, FIG. 2 schematically illustrates a network configuration 202, where the user terminal 202 has a web browser 206 running thereon. The operations of the browser 206 are controlled at least to a certain extent by the controller 204. The controller 204 is depicted in FIG. 2 as including the browser 206, but the controller 204 may also run concurrently to the browser 206 to control to flow of messages and requests reaching the browser 206.

The controller 204 in FIG. 2 is implemented using a browser add-on. The controller 204 may includes a receiver (not shown) configured for receiving a message including a request token. The controller 204 may further include a determiner (not shown) configured for determining whether the message meets policy settings governing the access to protected resources. Policy settings may be stored in the controller 204 or may be stored in a database or memory unit accessible by the controller 204. If the controller 204 determines that the message does not comply with the policy settings, the forwarder may be in charge of preventing the message from being forwarded to the service provider 210.

The user terminal 202 and the controller 204 may communicate so that the controller 204 is capable of making information available to the user terminal 202. In response, the user terminal 202 may adapt the policy settings used by the controller 204 to control messages arriving from the consumer 208. Setting, by a user through its user terminal 202, policy settings in the controller 204 may be implemented using a graphical user interface generated on a computer display (such as on the user terminal 202), so that a user may interact with the user terminal 202 to set the policy settings. The controller 204 acts as a privacy delegate for the user.

A message originating from the consumer 208 is received by the controller 204. The message includes a request to redirect (or to direct, which is synonymous here) the user terminal's web browser to the address of the service provider 210 associated with the request token. The controller 204 determines whether the redirect request should be prevented from being accepted based on the policy settings governing the access to protected resources. The consumer 208 first transmits the message to the controller 204 and then, depending on the determination made by the controller 204, the controller 204 may forward the request token to the service provider 210.

FIG. 2 also schematically illustrates a system including a controller 204 and a user terminal 202 capable of communicating with the controller 204, where the user terminal 202 is configured to run a web browser; and the message includes a request to redirect (or to direct) the user terminal's web browser to the address of the service provider 210 associated with the request token.

FIG. 2 is not limited to the specific configuration shown. For example, although only one consumer 208 and one service provider 210 are shown, more than one service provider 210 and more than one consumer 208 may be provided. Likewise, although only one user terminal 202 is illustrated as interacting with the other components of the network, more than one user terminal 202 may be involved. Further, the controller 204 and the user terminal 202 may be separate physical entities and the user terminal 202 is capable of communicating with the controller 204. In such a configuration, upon receiving a message including a request token from a consumer 208, the controller 204 determines whether the message meets policy settings governing the access to protected resources. A message that does not meet the policy settings is prevented from being forwarded to the service provider 210. In contrast, a message that meets the policy settings may be forwarded to the service provider 210. In such a manner, the policy settings are enforced.

Figure 3:
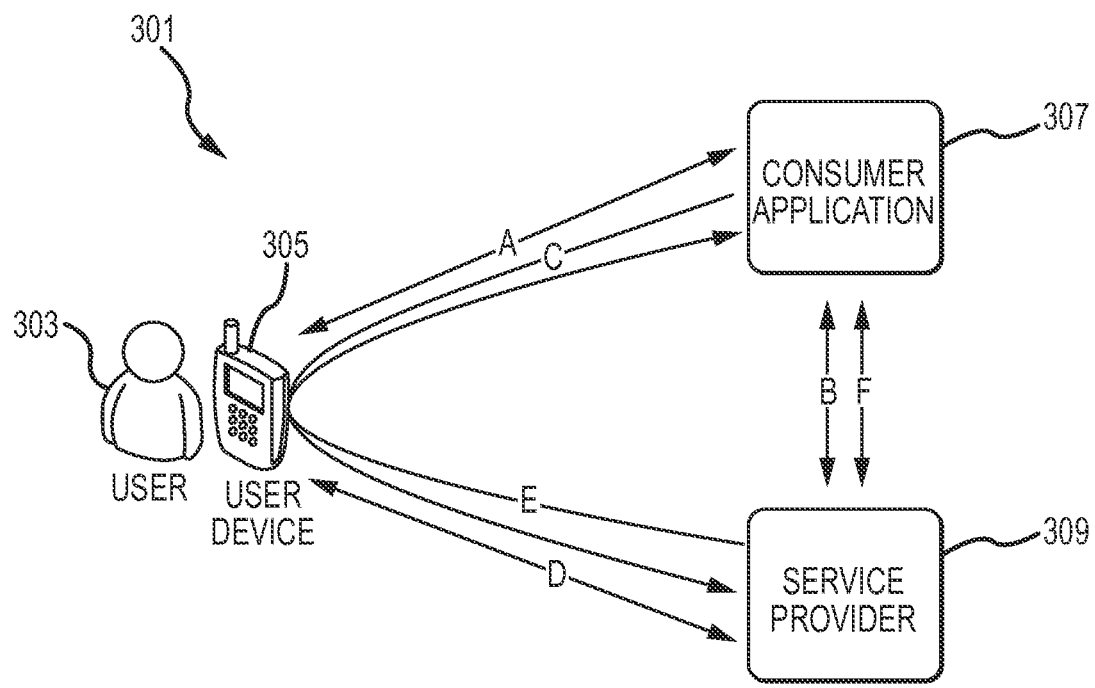
FIG. 3 is an illustrative authentication and authorization process in accordance with embodiments of the present disclosure.

FIG. 3 is an illustrative authentication and authorization process in accordance with embodiments of the present disclosure. FIG. 3 depicts an authentication and authorization process 301 (elements A-F) according to an open authentication protocol. However, the disclosure is not limited to any specific implementation of the open authentication protocol shown herein.

The open authentication protocol in FIG. 3 enables a consumer application 307 to access protected resources from a service provider 309 without requiring a user 303 to disclose their service provider credentials at the consumer application 307. The open authentication protocol uses tokens generated by the service provider 309 instead of the user's credentials in the requests for protected resources. The process uses two token types: request tokens and access tokens. Request tokens are used by the consumer application 307 to ask the user 303 to authorize access to the protected resources. The authorized request token is then exchanged for an access token. Access tokens are used by the consumer application 307 to access the protected resources on behalf of the user 303.

The authentication and authorization process illustrated in FIG. 3 includes the following steps: (A) user triggers the authorization process; (B) get unauthorized request token; (C) unauthorized request token; (D) authentication and authorization process; (E) authorized request token; and (F) protected social information access. In particular, first, the user 303 triggers the authorization process somehow (step A), for example by visiting a website on a browser (the consumer) by means of his or her user device 305. The authorization process then includes three consecutive steps: (1), (2), and (3).

In step (1), the consumer obtains an unauthorized request token from the service provider (step B). In step (2), the user authorizes the request token using his or her user device 305. To do so, first, the consumer sends to the user device 305 an unauthorized request token that the user device 305 forwards to the service provider (step C). Then, the service provider begins an authentication procedure with the user (step D) through the user device 305. If the authentication procedure is successful, the service provider authorizes the request token and provides the user device 305 with an authorized request token (step B), which the user device 305 forwards back to the consumer. If the authentication procedure is unsuccessful, the service provider may inform the consumer that the request token has been revoked, when forwarding the response through the user device 305. In step (3), the consumer exchanges with the service provider the authorized request token for an access token (step F) in order to subsequently access the user's protected resources from the service provider.

In accordance with the open authentication protocol, privacy management is handled by users themselves. Users authorize consumers to access protected resources of a service provider. Once the authorization is given, the consumer gets an access token to access to the protected resources.

Figure 4:
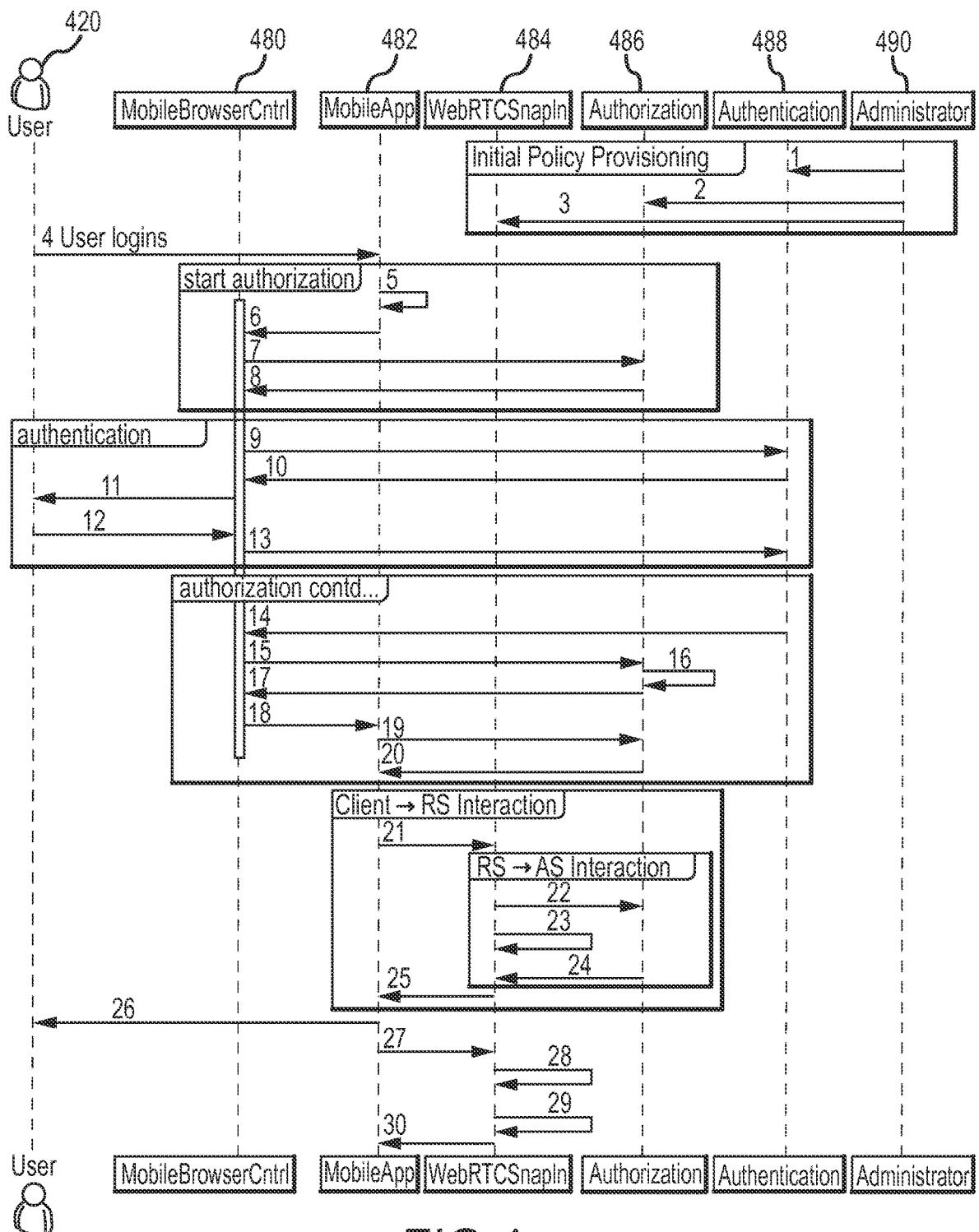
FIG. 4 is an illustrative description of a prior art authentication flow.

FIG. 4 is an illustrative description of a prior art authentication flow. In FIG. 4, a user 420 is logging in to an application 482 (for example, an application on the user's mobile device) via a web browser 480 (e.g., the embedded browser in the mobile application). The flow of FIG. 4 starts with initial policy provisioning that occurs between an administrator 490, an authentication server 488, an authorization server 486 (also referred to herein as "AS"), and a resource server 484.

The initial policy provisioning occurs prior to additional open authentication protocol in order to register a new application, which may involve registering basic information such as application name, website information, and image information, among others. In addition, a redirect uniform resource identifier (URI) is registered to be used for redirecting users for a web server, browser-based, or mobile applications.

The authentication server 488, the authorization server 486, and the resource server 484 may each include, but are not limited to, a collection of libraries and applications. The authentication server 488 provides a network service that applications use to authenticate the credentials (e.g., usernames and passwords) of users, such that when a consumer application submits a valid set of credentials, it receives an access token that it can subsequently use to access various services. The resource server 484 may enable more efficient inclusion of resources. The resource server 484 may be, for example, an application. The authorization server 486 issues access tokens to the consumer application after successfully authenticating the resource owner and obtaining authorization. The resource server may be the same as the authorization server in OAuth2. The administrator 490 may also be referred to as the OAuth2 Provider, and it may be an application that tracks and controls credentials and access, e.g., tracks which user has been given authorization to which application and has the ability to issue tokens to represent authorizations.

In FIG. 4, during the initial policy provisioning, the administrator 490 pushes the user details to the authentication server 488 in step 1, pushes the resource and client policy details to the authorization server 486 in step 2, and pushes the authorization server details to the resource server 484 in step 3.

The initial login of the user 420 begins with step 4, when the user 420 begins to log in to the mobile application 482, which begins the start authorization process. In the start authorization process, the mobile application 482 checks to see if a token is present in step 5, and upon finding that no token is present, the mobile application 482 launches the browser control via the web browser 480 in step 6. The web browser 480 attempts to obtain a token from the authorization server 486 in step 7, and in step 8 the authorization server 486 notifies the web browser 480 that user authentication is needed (e.g., the authorization server 486 redirects to the web browser 480 for authentication), which begins the authentication process.

The authentication process begins with the web browser 480 starting the authentication process by notifying the authentication server 488 in step 9, and in step 10 the authentication server 488 sends the authentication form to the web browser 480. When the web browser 480 receives the authentication from, the web browser shows a pop up to the user 420 for the user to enter their credentials in step 11. In step 12, the user provides their credentials to log in at the web browser pop up, and in step 13 the web browser 480 provides the authentication to the authentication server 488, which continues the authorization process.

In step 14, the authentication server 488 redirects to the web browser 480, confirming that the user 420 is authenticated. In step 15, the web browser 480 notifies the authorization server 486, prompting the authorization server 486 to check the authorization policy in step 16. In step 17, the authorization server 486 provides the authorization token to the web browser 480, and in step 18 the web browser 480 provides the authorization token to the mobile application 482. The mobile application 482 exchanges the authorization token for an access token at the authorization server 486 in step 19, and in step 20 the authorization server 486 grants the access token and provides it to the mobile application 482. The client/resource server/authorization server interaction then begins.

In the client/resource server interaction, in step 21, the mobile application 482 registers with the resource server 484 and this starts the resource server/authorization server interaction. In the resource server/authorization server interaction, in step 22, the resource server 484 validates the token with the authorization server 486. The resource server 484 then caches the token in step 23, and the authorization server 486 confirms the token is valid in step 24. After the resource server/authorization server interaction, the resource server 484 confirms the token validity with the web browser 482 in step 25, for example, by transmitting a 200 OK message.

Following the client/resource server/authorization server interaction, the web browser 482 notifies the user 420 that the login is successful in step 26, and invokes a Call Control Rest API at the resource server 484 in step 27. The resource server 484 validates the token locally in step 28, and finds the token valid in step 29. The resource server 484 then notifies the web browser 480 of the valid token in step 30, and the authentication flow for a user log in at a mobile application, as done in the prior art, is complete.

Figure 5:
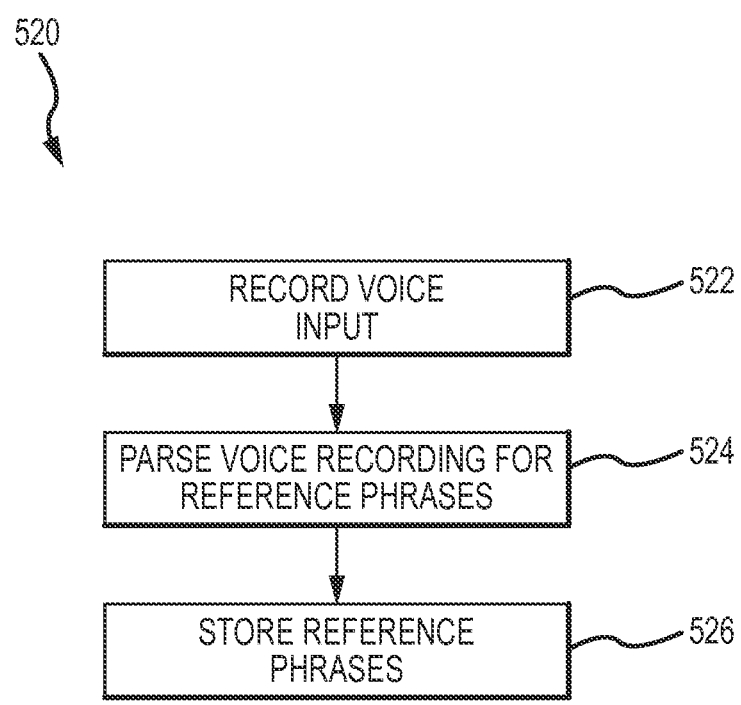
FIG. 5 is an illustrative flow chart showing a method of processing a voice input.

With reference now to FIG. 5, this figure shows an illustrative flow chart of a method of processing a voice input. In particular, FIG. 5 describes how a caller may call a Unified Communications (UC) server to provide a voice input. A method 520, according to an illustrative embodiment, to process the user's voice input includes recording the voice message, as indicated by block 522. The UC server may then parse the voice recording provided by the user into searchable reference phrases (including letters, numbers, and words) as indicated by block 524. The reference phrases may be associated with the caller's voice input and securely stored on the UC server, as indicated by block 526. Alternatively, the server may simply transcribe the entire voice input.

In an illustrative embodiment, the parsing operation shown in block 524 includes the UC server using a large vocabulary, speaker independent, speech recognition system to parse the recorded voice input. In an illustrative embodiment, the UC server may bookmark reference phrases or language patterns in the recorded voice input to provide for the automated or user activated replay of those reference phrases, so as to facilitate the retrieval of the reference phrases. In an illustrative embodiment, the parsing operation may include determining at least one tag to identify at least one reference portion of the recorded voice input, with each reference portion of the communication corresponding to a portion that a user may likely deem important. In providing a voice input, a user may interact with a voice navigational system provided using a TUI, for example, using voice commands and voice prompts provided to a user via a TUI. Using the processing of voice input, a user may log into the UC server via the TUI to perform an authentication and authorization process, as described herein.

Figure 6:
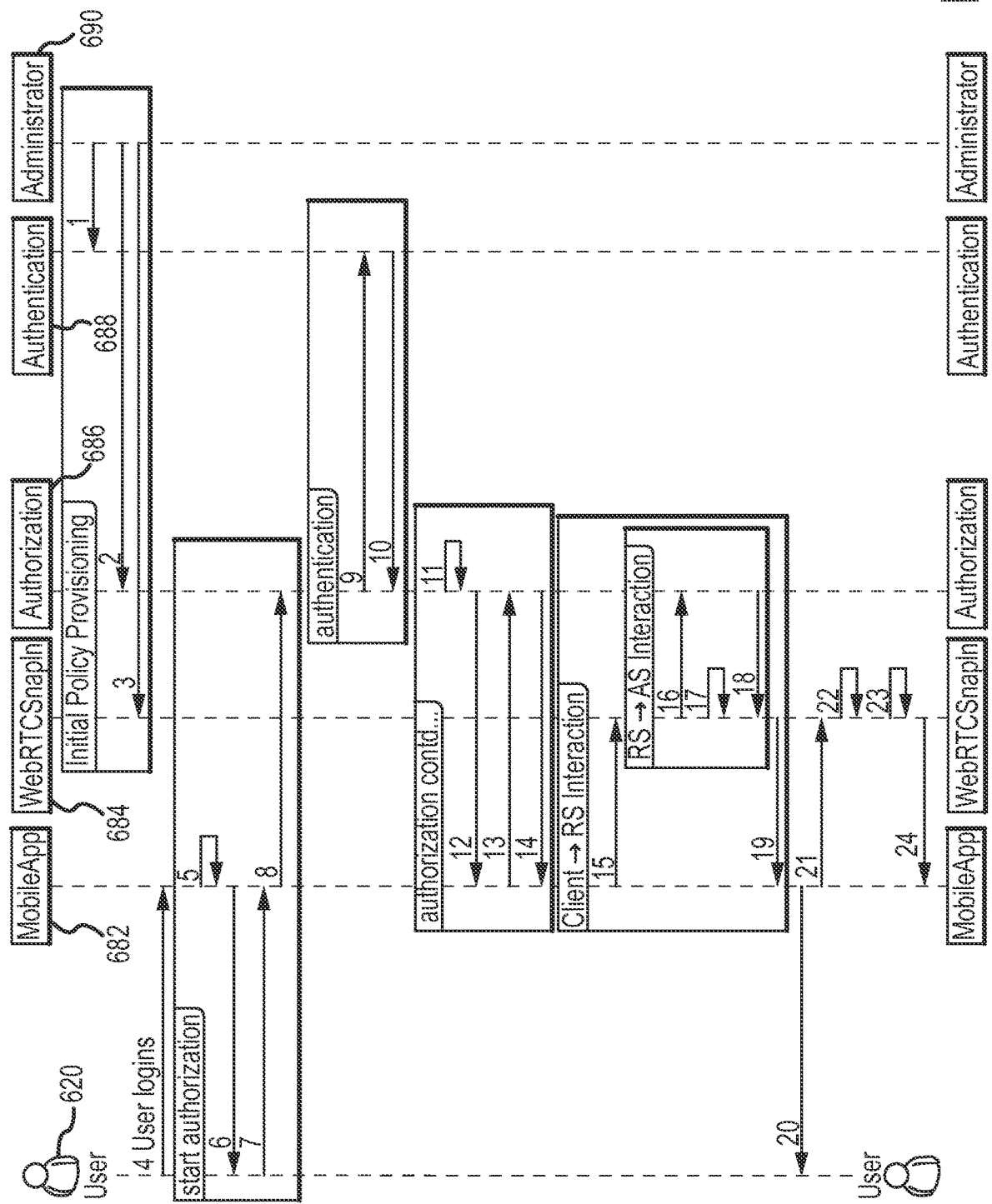
FIG. 6 is an illustrative description of an authentication flow in accordance with embodiments of the present disclosure.

FIG. 6 is an illustrative description of an authentication flow in accordance with embodiments of the present disclosure. In FIG. 6, a user 620 is logging in to an application 682. The flow of FIG. 6 starts with initial policy provisioning that occurs between an administrator 690, an authentication server 688, an authorization server 686, and a resource server 684.

The authentication server 688, the authorization server 686, and the resource server 684 may each include, but are not limited to, a collection of libraries and applications. The authentication server 688 provides a network service that applications use to authenticate the credentials (e.g., usernames and passwords) of users, such that when a consumer application submits a valid set of credentials, it receives an access token that it can subsequently use to access various services. The authentication server 688 may include a voice verification module that is, for example, an embedded module or an abstract entity that can be used to verify voice commands or other voice input of the user 620. For example, the authentication server, via a voice verification module, may verify a telephony personal identification number (TPIN), digits entered on the TUI, or other types of input. The resource server 684 may enable more efficient inclusion of resources. The resource server 684 may be, for example, an application such as WebRTCSnapIn. The authorization server 686 issues access tokens to the consumer application after successfully authenticating the resource owner and obtaining authorization. The resource server may be the same as the authorization server in OAuth2. The administrator 690 may also be referred to as the OAuth2 Provider, and it may be an application that tracks and controls credentials and access, e.g., tracks which user has been given authorization to which application and the administrator 690 has the ability to issue tokens to represent authorizations.

In FIG. 6, the initial policy provisioning occurs prior to additional OAuth2 protocol in order to register a new application, which may involve registering basic information such as application name, website information, and image information, among others. During the initial policy provisioning, the administrator 690 pushes the user details to the authentication server 688 in step 1, pushes the resource and client policy details to the authorization server 686 in step 2, and pushes the authorization server details to the resource server 684 in step 3.

The initial login of the user 620 begins with step 4, when the user 620 begins to log in to the mobile application 682, which begins the start authorization process. In the start authorization process, the mobile application 682 checks to see if a token is present in step 5, and upon finding that no token is present, the mobile application 682 requests access by playing a voice command to the user 620 in step 6. The user responds to the access grant request via a voice command in step 7 to allow access. In various embodiments, the user's voice command to allow access may be saved as a voice input file (e.g., voice_print). The mobile application thereby requests a token by presenting the voice input file to the authorization server 686 in step 8, which begins the authentication process.

The authentication process authenticates the user 620 for the given voice input with the authentication server 688 (e.g., redirects to the authentication server 688 for voice_print authentication) in step 9, and in step 10 the authentication server 688 confirms the validity of the voice input (e.g., transmits a 200 OK message) to the authorization server 686.

The authorization process continues in step 11, with the confirmation of validity prompting the authorization server 686 to check the authorization policy. In step 12, the authorization server 686 grants the authorization token to the mobile application 682, and in step 13 the mobile application 682 sends a message requesting to exchange the authorization code/token for the access token at the authorization server 686. In step 14, the authorization server 686 grants the access token to the mobile application 682. The client/resource server/authorization server interaction then begins.

In the client/resource server interaction, in step 15, the mobile application 682 registers with the resource server 684, which starts the resource server/authorization server interaction. In the resource server/authorization server interaction, in step 16, the resource server 684 validates the token with the authorization server 686. The resource server 684 then caches the token in step 17, and the authorization server 686 confirms the token is valid in step 18. After the resource server/authorization server interaction, the resource server 684 confirms the token validity with the mobile application 682 in step 19, for example, by transmitting a 200 OK message.

Following the client/resource server/authorization server interaction, the mobile application 682 notifies the user 620 that the login is successful in step 20, and invokes a Call Control Rest API at the resource server 684 in step 21. The resource server 684 validates the token locally in step 22, and finds the token valid in step 23. The resource server 684 then notifies the mobile application 682 of the valid token in step 24, and the authentication flow for a user log in at a mobile application using a telephone user interface (and/or voice_print) is complete. Advantageously, the authentication flow disclosed herein is devoid of interaction with a web browser, and requires a user to only provide a voice input for authentication. The methods and systems disclosed herein may advantageously allow OAuth2 protocols to be used without a web browser and may provide hands free access to a user by use of a voice user interface or telephone user interface.

Figure 7:
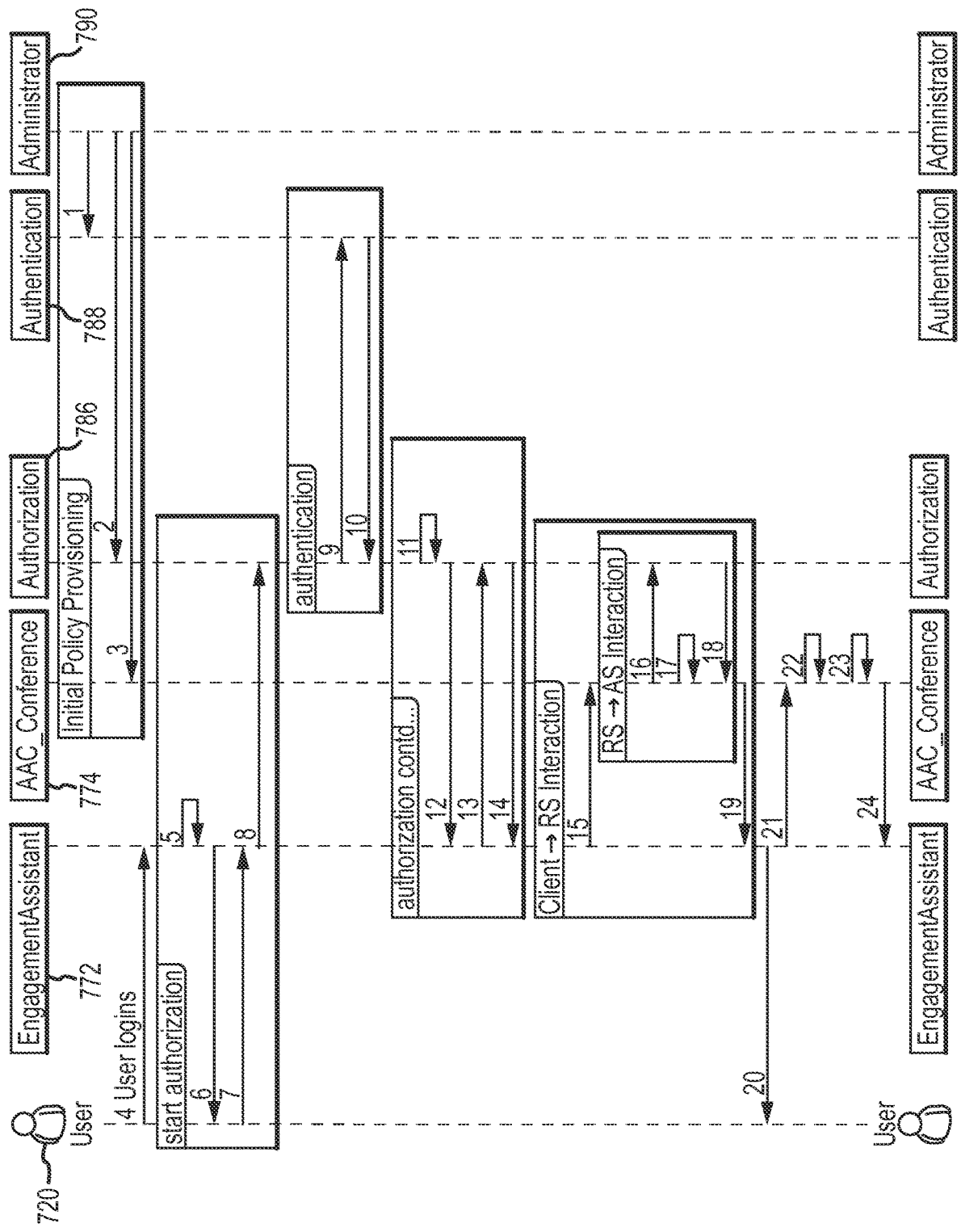
FIG. 7 is an illustrative description of an authentication flow in accordance with embodiments of the present disclosure.

FIG. 7 is an illustrative description of an authentication flow in accordance with embodiments of the present disclosure. In FIG. 7, a user 720 is logging in to a conference bridge using an application 772 (for example, an engagement assistant application that facilitates the connections of multiple callers together). The flow of FIG. 7 starts with initial policy provisioning that occurs between an administrator 790, an authentication server 788, an authorization server 786, and a conference server 774.

The authentication server 788, the authorization server 786, and the conference server 774 may each include, but are not limited to, a collection of libraries and applications. The authentication server 788 provides a network service that applications use to authenticate the credentials (e.g., usernames and passwords) of users, such that when a consumer application submits a valid set of credentials, it receives an access token that it can subsequently use to access various services. The conference server 774 facilitates conference calls and may be referred to as a resource server. For example, the conference server may enable more efficient inclusion of resources and monitor and control a conference bridge to administer a conference call session. The authorization server 786 issues access tokens to the consumer application after successfully authenticating the resource owner and obtaining authorization. The conference server may be the same as the authorization server in OAuth2. The administrator 790 may also be referred to as the OAuth2 Provider, and it may be an application that tracks and controls credentials and access, e.g., tracks which user has been given authorization to which application and has the ability to issue tokens to represent authorizations.

In FIG. 7, the initial policy provisioning occurs prior to additional protocol (e.g., OAuth2 protocol) in order to register a new application, which may involve registering basic information such as application name, website information, and image information, among others. During the initial policy provisioning, the administrator 790 pushes the user details to the authentication server 788 in step 1, pushes the resource and client policy details to the authorization server 786 in step 2, and pushes the authorization server details to the conference server 774 in step 3.

The initial login of the user 720 begins with step 4, when the user 720 attempts to log in to the application 772. In illustrative embodiments, the application 772 may be a web/Snap-In application that acts as a virtual personal secretary and helps with the collaborations sessions. For example, application 772 may auto dial for a conference call, present minutes of a meeting after a call, present a summary of previous discussions by mining through emails, presentation files, and other files, among other functions. This begins the start authorization process. In the start authorization process, the application 772 checks to see if a token is present in step 5, and upon finding that no token is present, the application 772 requesting access by playing a voice command to the user 720 in step 6. The user allows the access grant request via a voice command in step 7, and the mobile application thereby requests a token by presenting the voice input file (e.g., voice_print) to the authorization server 786 in step 8 and the authentication process then begins.

The authentication process authenticates the user 720 for the given voice input with the authentication server 788 (e.g., redirects to the authentication server 788 for voice_print authentication) in step 9, and in step 10 the authentication server 788 confirms the validity of the voice input (e.g., transmits a 200 OK message) to the authorization server 786. The authorization process continues in step 11, with the confirmation of validity prompting the authorization server 786 to check the authorization policy. In step 12, the authorization server 786 grants the authorization token to the application 772, and in step 13 the application 772 sends a message requesting to exchange the authorization code/token for the access token at the authorization server 786. In step 14, the authorization server 786 grants the access token to the application 772. Thus, the access token is advantageously granted without launching a browser and without any type of browser support. The client/conference server/authorization server interaction then begins.

In the client/conference server interaction, in step 15, the application 772 registers with the conference server 774 and this starts the conference server/authorization server interaction. In the conference server/authorization server interaction, in step 16, the conference server 774 validates the token with the authorization server 786. The conference server 774 then caches the token in step 17, and the authorization server 786 confirms the token is valid in step 18. After the conference server/authorization server interaction, the conference server 774 confirms the token validity with the application 772 in step 19, for example, by transmitting a 200 OK message.

Following the client/conference server/authorization server interaction, the application 772 notifies the user 720 that the login is successful in step 20, and invokes a Call Control Rest API at the conference server 774 in step 21. The conference server 774 validates the token locally in step 22, and finds the token valid in step 23. The conference server 774 then notifies the application 772 of the valid token in step 24, and the authentication flow for a user log in at a mobile application using a telephone user interface (and/or voice_print) is complete.

Figure 8:
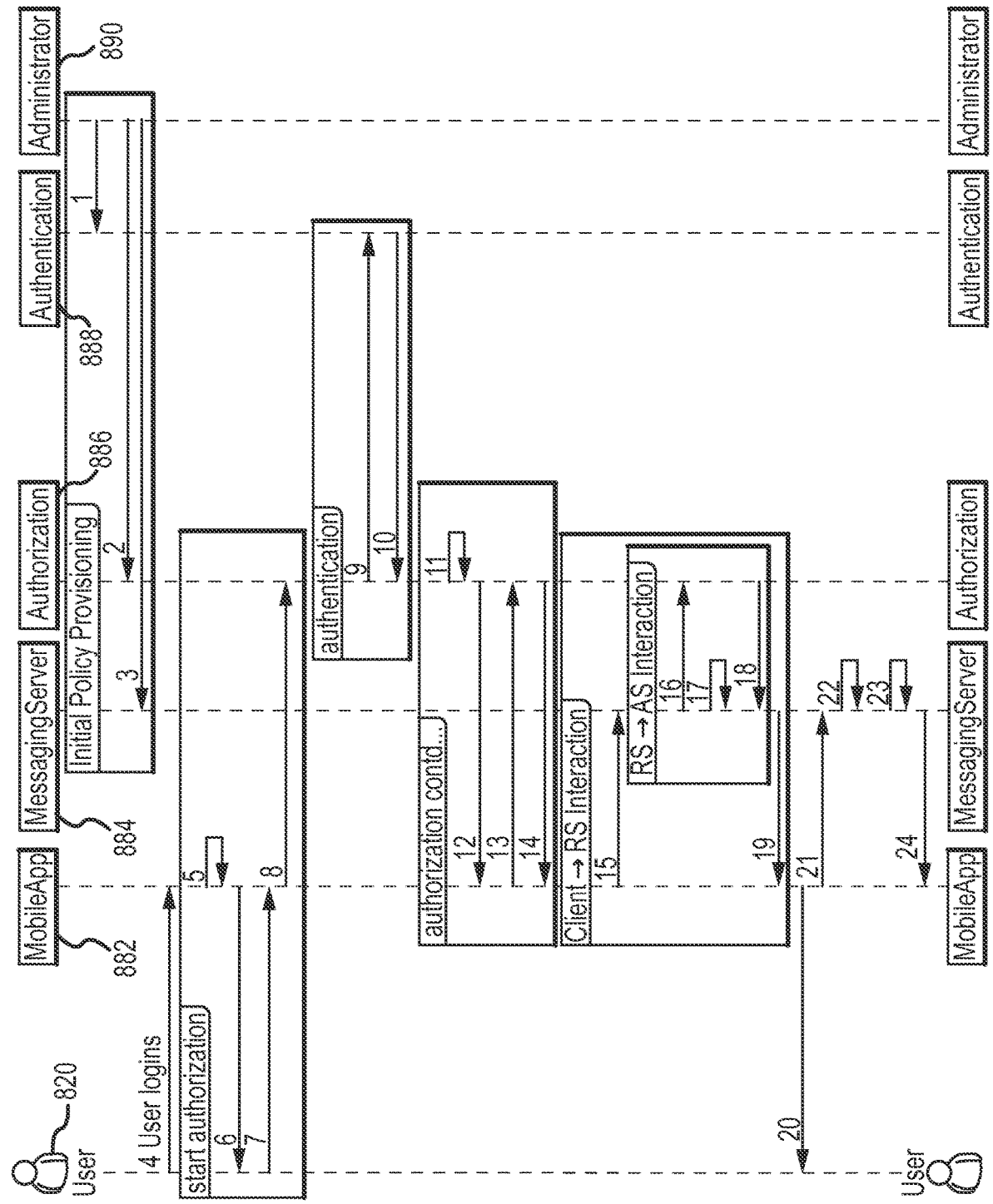
FIG. 8 is an illustrative description of an authentication flow in accordance with embodiments of the present disclosure.

FIG. 8 is an illustrative description of an authentication flow in accordance with embodiments of the present disclosure. In FIG. 8, a user 820 is logging in to an application 882 (for example, an application on the user's mobile device). The flow of FIG. 8 starts with initial policy provisioning that occurs between an administrator 890, an authentication server 888, an authorization server 886, and a messaging server 883.

The authentication server 888, the authorization server 886, and the messaging server 883 may each include, but are not limited to, a collection of libraries and applications. The authentication server 888 provides a network service that applications use to authenticate the credentials (e.g., usernames and passwords) of users, such that when a consumer application submits a valid set of credentials, it receives an access token that it can subsequently use to access various services. The messaging server 883 may enable more efficient inclusion of resources. The messaging server 83 may also be referred to as a resource server. The authorization server 886 issues access tokens to the consumer application after successfully authenticating the resource owner and obtaining authorization. The administrator 890 may also be referred to as the OAuth2 Provider, and it may be an application that tracks and controls credentials and access, e.g., tracks which user has been given authorization to which application and has the ability to issue tokens to represent authorizations.

In FIG. 8, the initial policy provisioning occurs prior to additional protocol (e.g., OAuth2 protocol) in order to register a new application, which may involve registering basic information such as application name, website information, and image information, among others. During the initial policy provisioning, the administrator 890 pushes the user details to the authentication server 888 in step 1, pushes the resource and client policy details to the authorization server 886 in step 2, and pushes the authorization server details to the messaging server 883 in step 3.

The initial login of the user 820 begins with step 4, when the user 820 begins to log in to the mobile application 882. This begins the start authorization process. In the start authorization process, the mobile application 882 checks to see if a token is present in step 5, and upon finding that no token is present, the mobile application 882 requesting access by playing a voice command to the user 820 in step 6. The user allows the access grant request via a voice command in step 7, and the mobile application thereby requests a token by presenting the voice input file, e.g., voice_print, to the authorization server 886 in step 8, which begins the authentication process.

The authentication process authenticates the user 820 for the given voice input with the authentication server 888 (e.g., redirects to the authentication server 888 for voice_print authentication) in step 9, and in step 10 the authentication server 888 confirms the validity of the voice input (e.g., transmits a 200 OK message) to the authorization server 886.

The authorization process continues in step 11, with the confirmation of validity prompting the authorization server 886 to check the authorization policy, e.g., by checking for the presence of the voice_print file. In step 12, the authorization server 886 grants the authorization token to the mobile application 882, and in step 13 the mobile application 882 sends a message requesting to exchange the authorization code/token for the access token at the authorization server 886. In step 14, the authorization server 886 grants the access token to the mobile application 882. Thus, the access token is advantageously granted without launching a browser and without any type of browser support. The client/messaging server/authorization server interaction then begins.

In the client/messaging server interaction, in step 15, the mobile application 882 registers with the messaging server 883, which starts the messaging server/authorization server interaction. In the messaging server/authorization server interaction, in step 16, the messaging server 883 validates the token with the authorization server 886. The messaging server 883 then caches the token in step 17, and the authorization server 886 confirms the token is valid in step 18. After the messaging server/authorization server interaction, the messaging server 883 confirms the token validity with the mobile application 882 in step 19, for example, by transmitting a 200 OK message.

Following the client/messaging server/authorization server interaction, the mobile application 882 notifies the user 820 that the login is successful in step 20, and invokes a Call Control Rest API at the messaging server 883 in step 21. The messaging server 883 validates the token locally in step 22, and finds the token valid in step 23. The messaging server 883 then notifies the mobile application 882 of the valid token in step 24, and the authentication flow for a user log in at a mobile application using a telephone user interface (and/or voice_print) is complete.

Figure 9:
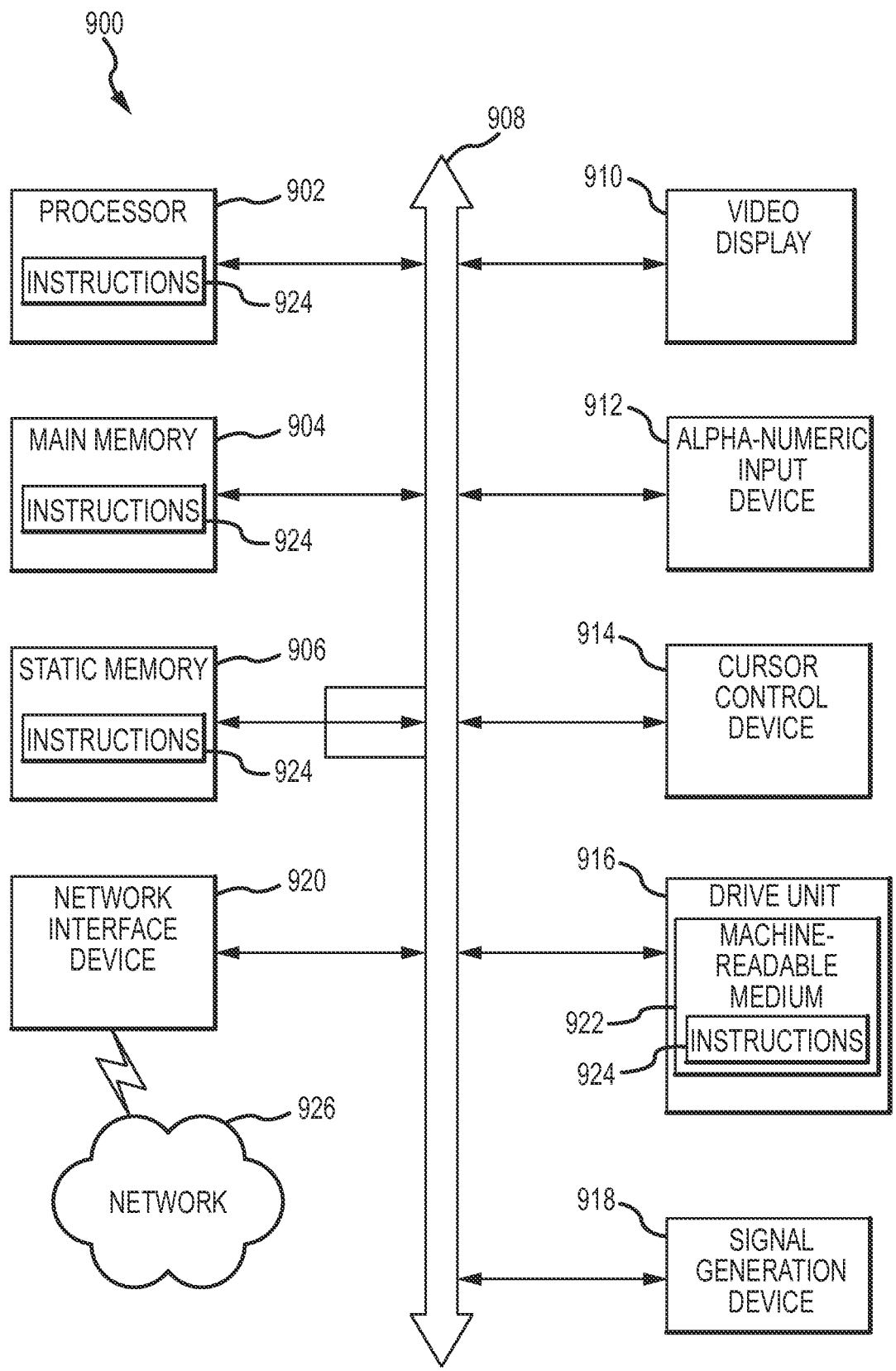
FIG. 9 is an illustrative computer system for performing any one or more of the methods discussed herein.

FIG. 9 shows a diagrammatic representation of machine in the example form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920 utilizing any one of a number of well-known transfer protocols (e.g., HTTP).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the above-described flowcharts have been discussed in relation to a particular sequence of events, it should be appreciated that changes to this sequence can occur without materially effecting the operation of the disclosure. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this disclosure can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this disclosure.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into software and/or hardware system, such as the hardware and software systems of a communications device or system.

It is therefore apparent that there has been provided, in accordance with the present disclosure, systems, apparatuses and methods for performing authorization a communication session. While this disclosure has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

What is claimed is:

1. A method for authorization, comprising:
receiving, by a microprocessor of an authorization server, a voice input with a request for a token;
sending, by the microprocessor, the voice input to an authentication server for validation;
receiving, by the microprocessor, an authorized request token from the authentication server based on validating the voice input;
receiving a request to exchange the authorized request token for an access token;
granting, by the microprocessor, the access token; and
based on the granting, logging a user in to a service.

2. The method of claim 1, wherein the microprocessor executes instructions for a consumer application, wherein the access token is generated by a provider of the service, and wherein the access token is used for the logging the user in instead of user credentials of the user.

3. The method of claim 2, wherein the request for the token is based on a determination that the access token is not present, at a time of the request, on a device of the user, and wherein the user provides the voice input.

4. The method of claim 3, further comprising:
in response to the determination that the access token is not present, playing a voice command to the user to prompt the user to respond to the voice command and generate the voice input.

5. The method of claim 1, wherein the requesting for the token comprises sending one of a voice print message and a Telephone User Interface message.

6. The method of claim 1, wherein the voice input is obtained from the user in response to a voice command and a determination that the access token is not present on a device associated with the user.

7. The method of claim 1, wherein the service is a mobile application.

8. The method of claim 1, wherein the logging in further comprises notifying, by the microprocessor, the service of the access token to allow the user to interact with the service.

9. The method of claim 1, wherein the method for authorization is an OAuth 2.0 protocol.

10. The method of claim 1, wherein the method for authorization is devoid of a browser interaction.

11. A system for authorization, comprising:
a microprocessor of an authorization server, the microprocessor programmed to:
receive a voice input with a request for a token;
send the voice input to an authentication server for validation;
receive an authorized request token from the authentication server based on validating the voice input;
receive a request to exchange the authorized request token for an access token;
grant the access token; and
based on the grant,
log a user in to a service.

12. The system of claim 11, wherein the validating of the voice input is performed by a second microprocessor that accesses protected resources from a service provider of the service.

13. The system of claim 12, wherein a service provider of the service manages user credentials and validates the access token.

14. The system of claim 11, wherein the request for the token comprises sending one of a voice print message and a Telephone User Interface message.

15. The system of claim 11, wherein the system uses the access token instead of user credentials to complete the log in.

16. The system of claim 14, wherein the voice input is obtained from the user in response to a voice command and a determination that the access token is not present on a device associated with the user.

17. The system of claim 14, wherein the system for authorization is an OAuth 2.0 protocol.

18. The system of claim 17, wherein the logging in of the user further comprises notifying, by the microprocessor, the service of the access token to allow the user to interact with the service.

19. The system of claim 14, wherein the grant of the access token is based on the one of the voice print message and the Telephone User Interface message.

20. An authorization server coupled to a communication network, wherein the authorization server comprises a microprocessor and a non-transitory computer-readable medium coupled thereto, and the microprocessor executes instructions from the non-transitory computer-readable medium and is programmed to:
receive a voice input with a request for a token;
send the voice input to an authentication server for validation;
receive an authorized request token from the authentication server based on validating the voice input;
receive a request to exchange the authorized request token for an access token;
grant the access token; and
based on the grant,
log a user in to a service.

* * * * *

UNITED STATES PATENT AND TRADEMARK OFFICE
CERTIFICATE OF CORRECTION

PATENT NO. : 11,196,739 B2
APPLICATION NO. : 14/801340
DATED : December 7, 2021
INVENTOR(S) : Sudhindra Kulkarni It is certified that error appears in the above-identified patent and that said Letters Patent is hereby corrected as shown below:

In the Claims

At Column 19, Line 8, please delete "requesting" and insert --request-- therein.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*